March 10, 1953     J. W. THOMAS     2,630,660
HACKAMORE BRIDLE
Filed April 25, 1952
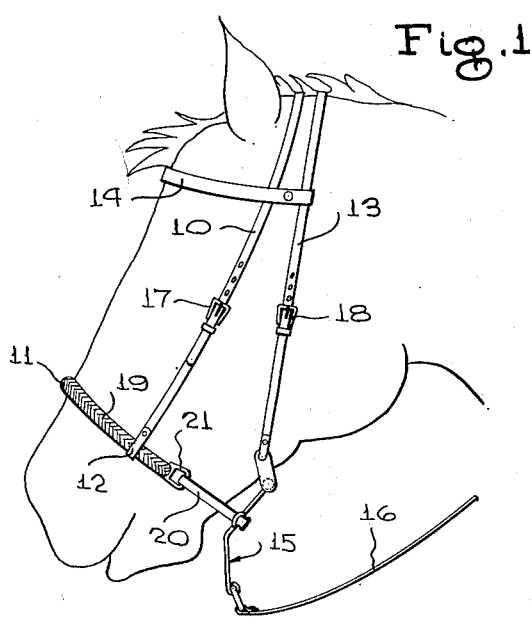
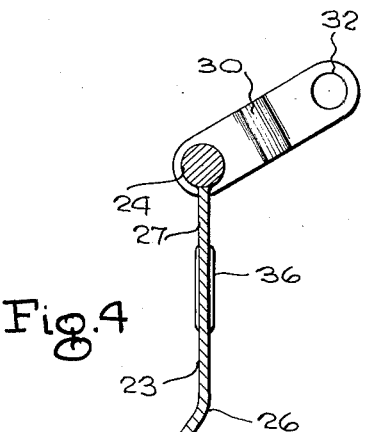
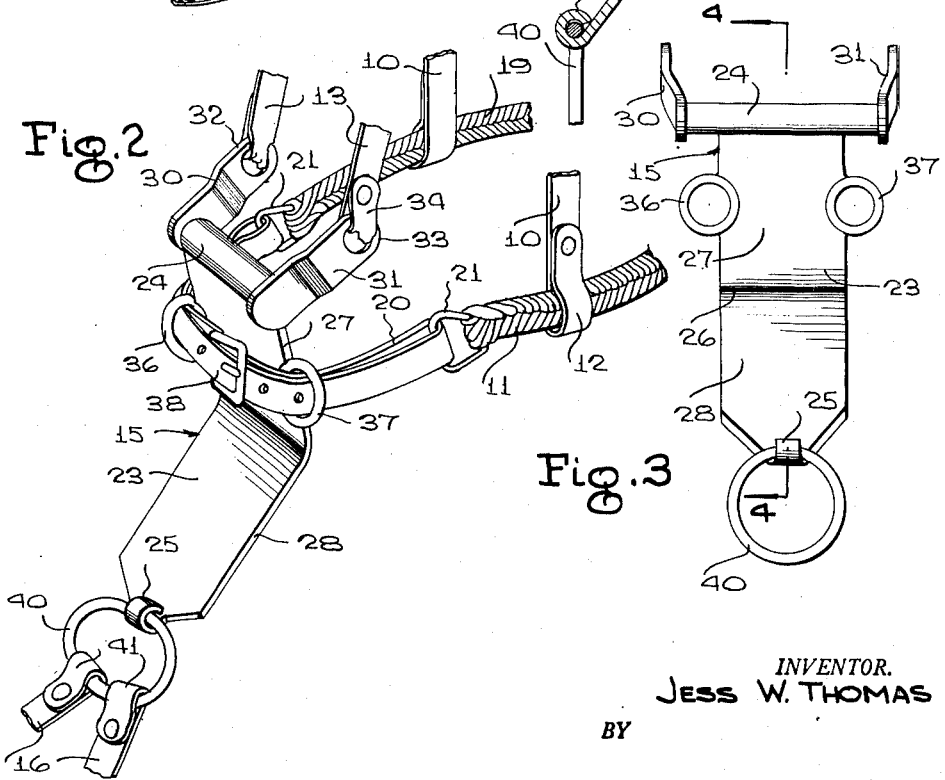
INVENTOR.
JESS W. THOMAS
BY
McMorrow, Berman & Davidson
ATTORNEYS Patented Mar. 10, 1953

2,630,660

UNITED STATES PATENT OFFICE 2,630,660

HACKAMORE BRIDLE

Jess W. Thomas, Decker, Mont.

Application April 25, 1952, Serial No. 284,225

3 Claims. (Cl. 54—6)

This invention relates to hackamore bridles and more particularly to a bit or lever for such a bridle.

It is among the objects of the invention to provide an improved hackamore bridle which includes nose encircling and head surrounding loops and a lever connected to both loops and to a rein for simultaneously applying pressure to a horse's head over the bridge of the nose, downwardly behind the ears and to the under or rear side of the jaw to provide a more effective control of the horse by the rider; in which the lever straddles the horse's jaw and effectively controls the horse without injury to the head or jaw of the horse; in which the loops are adjustable to accommodate the bridle to different head sizes and to vary the application of force to the horse's head to render the control by the bridle gentle or harsh; in which the lever has ample strength and rigidity to control even an unruly horse; and which is simple and durable in construction, economical to manufacture, and positive and effective in use.

Other objects and advantages will become apparent from a consideration of the following description and the appended claims in conjunction with the accompanying drawing wherein:

Figure 1 is a side elevational view of a hackamore bridle illustrative of the invention shown mounted on a horse's head;

Figure 2 is a perspective view of the bit of the bridle and the bridle portions directly connected to the lever;

Figure 3 is a rear elevational view of the lever; and

Figure 4 is a cross sectional view on the line 4—4 of Figure 3.

With continued reference to the drawing, the bridle comprises a cheek strap loop 10 which extends over the head of the horse just rearwardly of the ears, a nose loop 11 which encircles the horse's nose or muzzle above the mouth and which passes through loops 12 formed at the ends of the cheek strap loop 10, a head loop 13 which extends over the top of the horse's head just rearwardly of the cheek strap loop 10, a brow band 13 which extends around the forehead of the horse and has loops at its ends slidably receiving the head loop 13 to hold the head loop in place on the horse's head and a lever generally indicated at 15 connected at one end to the head loop 13 at the open end of the latter and intermediate its length to the nose loop 11, and a rein 16 connected to the other end of the bit.

The cheek strap loop 10 and the head loop 13 have length adjusting connections, as indicated at 17 and 18 respectively, therein, and the nose loop 11, as illustrated, includes a braided portion 19 the ends of which are connected to the ends of a double strap 20 by rings, as indicated at 21.

The lever 15, as illustrated in detail in Figures 2, 3 and 4, comprises a flat metal plate 23 of elongated, rectangular shape having at one end a cylindrical formation 24 extending transversely thereof and projecting substantially equal distances beyond the opposite sides thereof, and an eye formation 25 at its other end disposed substantially symmetrically of the longitudinal center line of the plate. The plate is bent, as indicated at 26, intermediate its length, so that portions 27 and 28 thereof at opposite sides of the bend and of substantially equal length are disposed at an obtuse angle to each other.

Flat ears 30 and 31 are secured, each at one end, to the cylindrical formation 24 at the respectively opposite ends of the cylindrical formation and extend to the outer or convex side of the plate 23 in spaced apart and substantially parallel relationship to each other and at an obtuse angle to the portion 27 of the plate. These ears 30 and 31 are provided at their distal ends with eye formations 32 and 33 respectively, and the head loop 13 is provided at its ends with loops, as indicated at 34, engaged in the eye formations 32 and 33 to connect the head loop to the lever.

Ring formations 36 and 37 are provided on the plate 23, one at each side of the plate portion 27 adjacent the bend 26 in the plate, and the doubled strap 20 extends through these ring formations and across the portion of the plate 23 therebetween, being provided with a length adjusting connection 38 between the ring formations. A ring 40 is loosely secured in the eye formation 25 at the end of the plate 23 remote from the ears 30 and 31 and the ends of the rein 16 are secured to this ring by loops, indicated at 41.

When the bridle is mounted on a horse's head, as illustrated in Figure 1, the loops 10 and 13 extend over the top of the horse's head rearwardly of the ears and downwardly along the cheeks, a brow band 14 extends forwardly from the head loop 13 across the cheek strap loop 10 and around the forehead of the horse and the nose loop 11 encircles the horse's nose at the lower end of the cheek strap loop 10. The lever 23 is disposed at the under or rear side of the horse's jaw with the ears 30 and 31 at its upper end and inclined upwardly and forwardly from the portion 27 of the plate and with the portion 28 of the lever inclined downwardly away from the horse's jaw and connected to the rein 16 at its lower end.

With this arrangement, when the rider pulls on the rein 16 the lower end of the lever 23 is pulled rearwardly forcing the cylindrical formation 24 against the under side of the horse's jaw, the ears 30 and 31 straddling the jaw, and simultaneously pulls the nose loop 11 against the bridge portion of the horse's nose and the head loop 13 downwardly at the top of the horse's head to the rear of the ears. As the jaw and the bridge of the nose and top of the head rearwardly of the ears are all sensitive portions of the horse's head, most horses will consistently respond to pressure at these locations and a highly sensitive and effective control of the horse is thus provided. The bridle can be adjusted to different head sizes and also to raise or lower the lever relative to the horse's head and hold it closer to or further away from the jaw to thereby vary the pressure and render the control more or less gentle or harsh, as may be desired.

This lever has been found particularly effective in work, such as rodeo roping, where correct and substantially instantaneous response of the horse to the rider's control is necessary to accomplish the work in the limited, competitive time allowed.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A hackamore bridle comprising a cheek strap loop, a head loop extending along said cheek strap loop and adapted to extend over a horse's head rearwardly of the ears, a brow band secured at its ends to said head loop and adapted to extend past said cheek strap loop around the forehead of the horse to hold said head strap loop in place, a lever comprising a metal plate of elongated rectangular shape bent intermediate its length to provide portions disposed at an angle to each other, ears extending from said plate at one end thereof to the convex outer side of the plate and disposed one at each side of the plate and at an angle to the adjacent portion thereof, said ears having at their distal ends eye formations in which the ends of said head loop are secured, said plate being disposed at the under side of a horse's jaw when the bridle is mounted on a horse's head with said ears at the upper end of the plate and extending forwardly and upwardly therefrom one at each side of the jaw and the portion of said plate remote from said ears inclined downwardly away from the jaw, ring formations on said plate one at each side thereof adjacent the bend therein, said nose loop extending through said ring formations and across said plate and having a length adjusting connection between said ring formations, an eye formation on the end of said plate remote from said ears, a ring secured to said plate by the eye formation thereon, and a rein connected at its ends to said ring.

2. A hackamore bridle comprising a lever including an elongated flat plate having a transversely extending cylindrical formation at one end and an eye formation at its other end, said plate providing longitudinally extending portions of substantially equal length disposed at an obtuse angle to each other, ears extending from said cylindrical formation one at each end of the latter and at an obtuse angle to the adjacent portion of said plate, ring formations on said plate disposed one at each side of the portion carrying said cylindrical formation adjacent the juncture between said portions, and a ring secured to said plate by the eye formation at the other end of the latter, a head loop secured at its ends to the distal ends of said ears, a nose loop extending through said ring formations and across said plate, and a rein connected at its ends to said ring.

3. A lever for a hackamore bridle comprising an elongated flat plate having a transversely extending cylindrical formation at one end and an eye formation at its other end, said plate providing longitudinally extending portions disposed at an angle to each other, ears extending from said cylindrical formation one at each end of the latter and at an obtuse angle to the adjacent portion of said plate, ring formations on said plate disposed one at each side of the portion carrying said cylindrical formation adjacent the juncture between said portions, and a ring secured to said plate by the eye formation at said other end thereof.

JESS W. THOMAS.

REFERENCES CITED

The following references are of record in the file of this patent:

UNITED STATES PATENTS

| Number | Name | Date |
| --- | --- | --- |
| 77,317 | Pope | Apr. 28, 1868 |
| 229,405 | Hartman | June 29, 1880 |
| 2,471,121 | Reed | May 24, 1949 |